Jan. 29, 1957  E. J. SCHAEFER  2,779,637
THRUST BEARING
Filed April 5, 1952  2 Sheets-Sheet 1
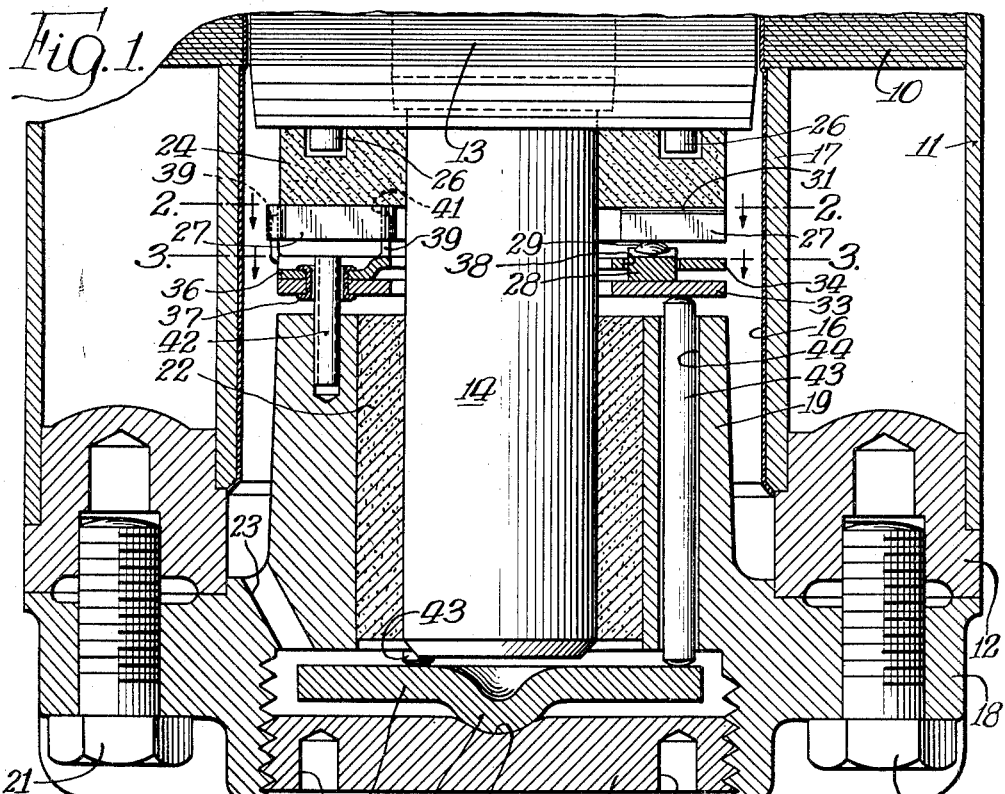
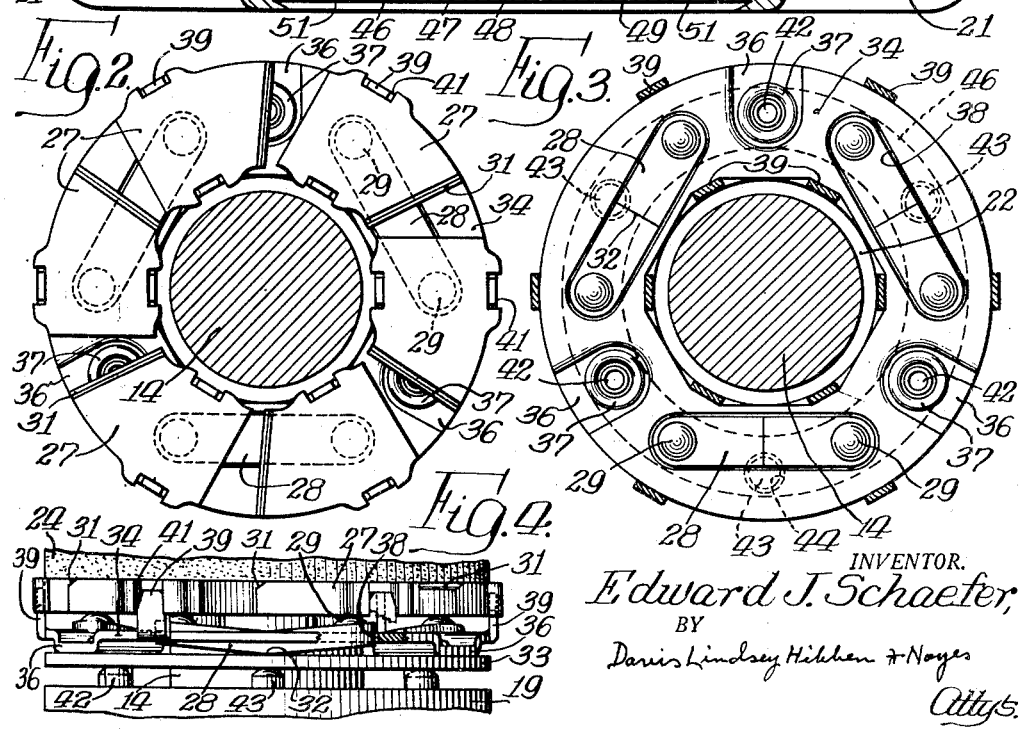
INVENTOR.
Edward J. Schaefer,
BY
Davis Lindsey Hibben & Noyes
Attys.

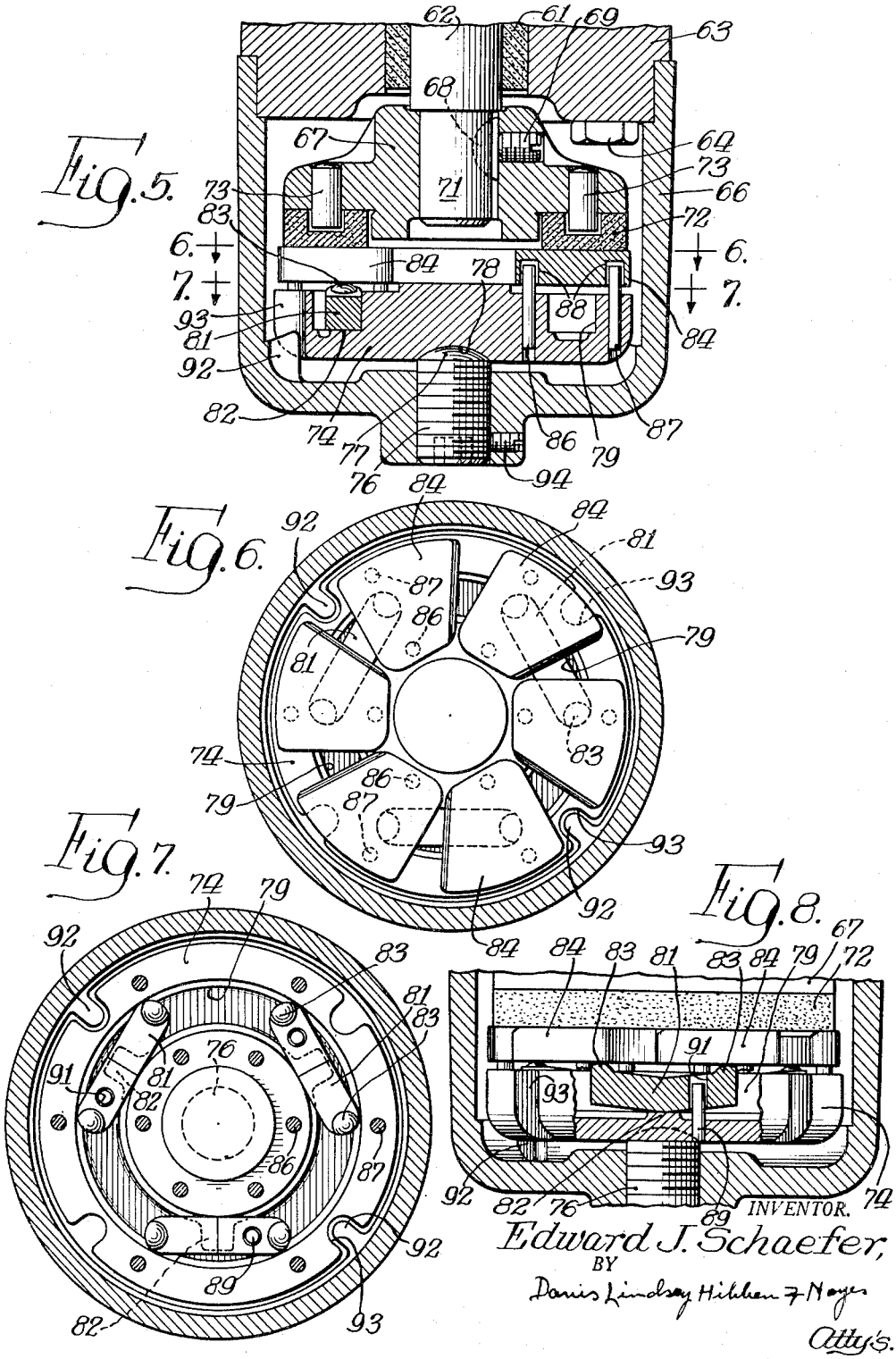

United States Patent Office 2,779,637
Patented Jan. 29, 1957

2,779,637
THRUST BEARING
Edward J. Schaefer, Fort Wayne, Ind.

Application April 5, 1952, Serial No. 280,705

19 Claims. (Cl. 308—160)

This invention relates generally to thrust bearings of the Kingsbury type and more particularly to improvements in such bearings which will enable them to be used satisfactorily in submersible motors wherein water is relied upon as the lubricating medium for the bearings.

Kingsbury type thrust bearings, as heretofore known, have utilized a plurality of tiltable bearing segments or shoes which coact with a rotating bearing member, the bearing surfaces being separated by a thin film of lubricating oil rather than in metal-to-metal contact. In addition, provision has been made to permit automatic equalization or pressure distribution between the various tiltable bearing segments.

However, I have found that the constructions previously suggested for use with oil lubrication are not satisfactory in the case of a water lubricated thrust bearing such as used in a submersible motor in which water is allowed to enter the interior of the motor. Even in an oil lubricated thrust bearing of the Kingsbury type it is necessary to provide a high degree of accuracy and uniformity in the bearing segments and their supports in order to obtain adequate equalization of the thrust load between the various segments. However, in the case of water, the lubricating film is much thinner than with oil and as a result the problem is substantially greater. In fact, for water lubricated operation it becomes commercially impractical to control the thickness of the bearing segments and the perpendicularity of the supporting structure to the extent necessary to meet even the minimum requirements for adequate pressure distribution.

Accordingly, it is a primary object of my invention to provide a novel and improved thrust bearing of the Kingsbury type which is capable of satisfactory use with water as the lubricating medium.

A further object of the invention is to provide a novel combination of a radial bearing, a thrust bearing of the foregoing type, and means for equalizing the load between the bearing members of the latter.

Still another object of the invention is to provide a novel thrust bearing suitable for use under high loads with water lubrication without resorting to complex and expensive constructions or complicated adjusting mechanisms.

Other objects and advantages of the invention will become apparent from the subsequent detailed description taken in conjunction with the accompanying drawings wherein:

Fig. 1 is a vertical sectional view of the lower end portion of a submersible motor showing one embodiment of the thrust bearing comprising my invention;

Fig. 2 is a transverse sectional view taken along the line 2—2 of Fig. 1;

Fig. 3 is a transverse sectional view taken along the line 3—3 of Fig. 1;

Fig. 4 is a fragmentary side elevational view of a portion of the device shown in Fig. 1;

Fig. 5 is a vertical sectional view of the lower end portion of a submersible motor showing a different embodiment of the invention;

Fig. 6 is a transverse sectional view taken along the line 6—6 of Fig. 5;

Fig. 7 is a transverse sectional view taken along the line 7—7 of Fig. 5; and

Fig. 8 is a fragmentary side elevational view of a portion of the device shown in Fig. 5.

Referring first to Figs. 1–4 of the drawings, the reference numeral 10 designates the stator of a motor of the submersible type in which water is permitted to enter the interior of the motor. The stator 10 is enclosed by an outer casing 11 and an end member 12. A rotor 13 carried on a rotor shaft 14 is mounted within the stator 10, and the interior of the stator 10 is sealed by a thin sleeve 16 extending between the rotor and the stator so that the stator windings are protected from water. The thin liner or sleeve 16 extends downwardly from the stator 10 along a spacer sleeve 17 and is suitably sealed to the end member 12. At the lower end of the motor, a cap 18 having an axially extending tubular portion 19 is secured to the end member 12 by means of a plurality of screws 21. A radial bearing 22 of graphite is mounted within the tubular portion 19 and surrounds the lower end of the shaft 14. A passageway 23 in the cap 18 permits access of water as a lubricant to the lower end of the shaft 14 and the radial bearing 22.

The thrust bearing includes a graphite disk 24 mounted around the shaft 14 and loosely held for rotation with the rotor 13 by means of a plurality of pins 26. The lower face of the disk 24 constitutes one of the thrust bearing surfaces. The coacting non-rotating thrust surface is provided by a plurality of metal segments or shoes 27 which are disposed in pairs at the opposite ends of a plurality of rocker arms 28, six such segments being shown in this instance. The end of each rocker arm 28 is formed with a rounded bump or projection 29 for rockably supporting the corresponding segment 27. As is customary in thrust bearings of this general type, the leading edge, indicated at 31 (Figs. 1, 2, and 4) of each segment 27 is slightly slanted or tapered so that during operation water is literally dragged or forced in between each segment 27 and the coacting disk 24 to provide a lubricating film therebetween. The rockable supports 29 for the segments 27 permit the latter to tilt or rock as required in response to the wedging action or pressure of the film of water. For permitting automatic alignment and leveling between the individual segments 27 of each pair of segments, the rocker arms 28 are each bent at their mid-points, as seen at 32 in Fig. 4, and the midpoint is pivotally supported on an annular member or washer 33. Thus, by rocking movement of the arms 28 on the washer 33, accurate alignment of the individual segments 27 in groups of two is realized.

The rocker arms 28 and the washer 33 are retained in assembled relation by means of an annular cage 34 having a plurality of peripherally spaced depressed portions 36 which seat against the washer 33 and serve to space the body portion of the cage axially from the underlying washer. Eyelets, indicated at 37, are provided for securing the depressed portions 36 of the cage 34 to the washer 33. The annular body portion of the cage 34 is formed with elongated slots 38 in which the rocker arms 28 loosely fit with the mid-points 32 of the arms extending below the slots 38 into contact with the washer 33 and the ends of the arms 28 projecting above the slots 38. The inner and outer peripheries of the annular cage 34 are provided with a plurality of upturned prongs 39 which interfit loosely with corresponding notches 41 (Fig. 2) formed in the segments 27 for holding the latter in place on the rounded rocker arm supports 29. Thus, each segment 27 is retained in place by a pair of oppositely disposed prongs 39. The entire assembly is held against rotation by means of a plurality of pins 42 projecting upwardly from the tubular portion 19 of the cap 18 and extending through the eyelets 37.

For permitting automatic alignment and pressure equalization between each of the three rocker arms 28, I provide a three point support for the washer 33 by means of three elongated pins 43 located on the same radii with and substantially under the points of pivotal contact between the rocker arms 28 and the washer 33. The support pins 43 extend loosely through suitable bores 44 provided in the tubular extension 19 of the cap 18 and bear against a leveling disk 46 provided at the bottom of the motor structure. The disk 46 has a central rounded projection 47 which seats in a complementary rounded depression 48 formed in an adjustable closure plug 49 which is threaded into the lower end of the cap 18. The plug 49 is provided with a plurality of depressions 51 adapted to receive a spanner wrench for adjusting the plug 49 whereby to regulate the elevation or axial position of the lower end of the rotor shaft 14. By reason of the spherical seating arrangement 47—48 disposed centrally of the leveling disk 49, the support pins 43 automatically assume the positions necessary to level the washer 33 so that the rocker arm assembly supported thereon is likewise automatically leveled. Consequently, as a result of the alignment afforded between each rocker arm-supported pair of bearing segments and the three point automatic leveling support of the entire rocker arm assembly, I am able to obtain exact planar alignment and leveling between the various segments 27 even with water lubrication.

The pivotal mounting of the disk 46 is a very important feature of my invention since I have found that the satisfactory operation of the bearing with water lubrication depends to a large extent on the centrally pivoted leveling disk. I desire to maintain the contact area between the pivoted portions 47—48 as small as possible in order to reduce friction therebetween so that water lubrication will suffice. Thus, by keeping the depression 48 and the coacting projection 47 of restricted size, I obtain a support which closely approximates a single point support so that for all practical purposes the disk 46 is universally tiltable substantially about its geometric center. This is in marked contrast to previous leveling arrangements in oil lubricated Kingsbury type bearings wherein the seating area of the leveling element is in the form of a relatively large spherically curved annulus surrounding the shaft which the bearing supports. In the latter type of leveling arrangement, rocking or pivotal movement of the leveling element is accompanied by a definite lateral displacement or shifting movement of the element, whereas in the present invention the leveling disk undergoes substantially only pivotal or tilting movement relative to its center.

The restricted nature of the contact area of the pivotal support 47—48 for the disk 46 is evident from Fig. 1 in which it will be seen that this contact area is at the center of the disk 46 below the lower end of the shaft 14 and lies wholly within the confines of the periphery of the shaft 14 as well as within the confines of the circumferentially spaced pins 43 and the points of pivotal support of the rocker arms 28 on the washer 33. The centrally pivoted support of the disk 46 permits the latter to tilt in any direction to compensate for variations in flatness of the disk 46, differences in length of the pins 43, variations in thickness of the washer 33, dimensional differences in the rocker arms 28, etc. Thus, the pressure on the respective segments 27 is equalized since excess pressure on any one segment will result in tilting of the disk 46.

In Figs. 5–8 of the drawings, I have shown a somewhat modified form of the invention which is specially suited for larger size submersible motors. In the form of the invention shown in Figs. 1–4, the radial bearing is disposed between the thrust bearing and the end of the motor housing. However, in the form shown in Figs. 5–8 the thrust bearing is located between the radial bearing and the end of the housing. Thus, as seen in Fig. 5, a radial bearing 61 of graphite is disposed around the lower end of the rotor shaft, indicated at 62. The bearing 61 is mounted in an end member 63 which is clamped to the bottom of the stator laminations (not shown) by a screw or bolt 64. An end bell or housing 66 is secured to the member 63 and provides a chamber for the thrust bearing and its leveling mechanism. A thrust disk 67 is secured by means of a key 68 and a set screw 69 to a reduced extension 71 provided at the lower end of the shaft 62. The disk 67 thus rotates with the shaft 62, and a graphite disk or ring 72 comprising the rotatable thrust bearing member is connected to the disk 67 for rotation therewith by means of a plurality of pins 73.

A leveling disk 74 is centrally supported at the bottom of the housing 66 by means of an adjustable screw 76 having a rounded or generally spherical inner end 77 which seats in a mating depression or cavity 78 at the underside of the disk 74. A concentric groove or channel 79 is provided at the upper side of the disk 74, and a plurality of bent rocker arms 81, three being provided in this instance, are disposed tangentially in the channel 79 with their mid-points being rockably seated on suitable flats 82 elevated slightly from the base of the channel and spaced circumferentially therearound. The opposite ends of the rocker arms 81 are formed with rounded projections 83 for rockably supporting a plurality of metal bearing segments 84 in generally the same manner as hereinbefore described in connection with Figs. 1–4.

The segments 84 are held against rotation and retained in position on the supports 83 by means of a pair of oppositely disposed inner and outer pins 86 and 87 (see Fig. 5), respectively, which extend upwardly from the disk 74 on both sides of the groove 79 and fit loosely within corresponding sockets or openings 88 at the underside of each segment. As clearly seen in Figs. 6 and 7, each of the pins 86—87 is located on a radial line passing through the pivot point or support 83 for the corresponding segment 84. Thus, each bearing segment 84 is restrained only at points in substantial alignment with the pivot point of the segment so as to minimize frictional restraint against tilting of the segment. In addition, the rocker arms 81 are each retained in proper position on the corresponding supports 82 by means of an upright pin 89 (see Fig. 8) extending upwardly from the base of the groove 79 and being loosely received in an enlarged bore 91 provided in one half of the rocker arm 81.

The disk 74 is held against rotation by means of a pair of radial shoulders or ribs 92 which are formed integrally at the bottom of the bell or housing 66 and are received in keying relation within complementary indentations 93 provided in the outer periphery of the disk 74. Thus, it will be understood that the operation of the bearing surfaces is essentially the same as in the first-described form of the invention, the rotating graphite bearing member 72 coacting with the upper surfaces of the non-rotating metal bearing segments 84 and the latter being tiltable microscopically under the wedging action of the water so that the coacting bearing surfaces are separated by a cushioning water film.

Each pair of segments 84 is aligned or leveled by reason of its supporting rocker arm 81 and the three rocker arms are in turn automatically aligned by reason of the central spherical seating arrangement of the leveling disk 74 on the screw 76. Thus, the leveling arrangement is somewhat simpler than in the first embodiment of the invention but the same end result of exact planar alignment of all six bearing segments is obtained in substantially the same manner and with water lubrication. In addition, the screw 76 is adjustable at its threaded fit in the bottom end of the housing 66 so as to regulate the axial position of the rotor shaft 62. A set screw 94 is employed to secure the adjusting screw 76 in predetermined position.

From the foregoing, it will be seen that my invention provides a relatively simple thrust bearing construction of the Kingsbury type in which the pressure distribution is equalized between the several bearing segments without the necessity of impractical dimensional control during manufacture or the provision of individual height adjustments for the segments or rocker arms. As previously mentioned, I have found that the arrangements heretofore proposed for leveling and pressure equalization are totally inadequate in the case of water lubrication. However, by utilizing a centrally pivoted leveling disk with three rocker arms operatively supported thereon and each rocker arm carrying a pair of rockable self-aligning segments, I am able to obtain excellent results even under the adverse conditions inherent in water lubrication. With the arrangements described above I have been able to reduce friction losses even under extremely heavy loads to a point equal to the performance of an oil lubricated ball bearing.

Although the invention has been described in particular relation to certain specific structural embodiments, it is to be understood that various modifications and equivalents may be employed without departing from the scope of the invention as defined in the appended claims.

I claim:

1. In combination, a vertical shaft, housing structure in fixed relation around the lower end of said shaft, a thrust bearing member secured around said shaft and rotatable therewith, a plurality of coacting non-rotatable rockable bearing segments, pressure-equalizing means including a tiltable disk having said segments operatively supported thereon whereby to permit equalization of thrust pressure among said segments, and directly accessible adjusting means at the lower end of said housing structure, said adjusting means coacting with said disk and being movable relative to the housing structure for moving said disk and thereby adjusting the axial position of said shaft relative to the housing structure.

2. In combination, a vertical shaft, housing structure around the lower end of said shaft, a thrust bearing member secured around said shaft and rotatable therewith, a plurality of coacting non-rotatable rockable bearing segments, pressure-equalizing means including a tiltable disk having said segments operatively supported thereon whereby to permit equalization of thrust pressure among said segments, and a supporting member adjustably fitted at the lower end of said housing structure and engaging said disk substantially at its center for permitting tilting movement of the latter, said supporting member being adjustable inwardly and outwardly of said housing structure for regulating the relative axial position of said shaft.

3. In a thrust bearing of the type described, a plurality of rockable bearing segments, a plurality of rocker arms having said segments rockably supported thereon, an annular member having said rocker arms tiltably supported thereon, a leveling disk tiltably supported substantially at its center in axially spaced relation below said annular member, and a plurality of elongated supporting elements extending axially between said annular member and said disk.

4. The device of claim 3 further characterized in that said supporting elements engage the lower side of said annular member substantially below the points of pivotal contact of said rocker arms with the upper side of said annular member.

5. In a thrust bearing of the type described, a flat annular member adapted to encircle a shaft, a plurality of rocker arms tiltably supported on said annular member, an annular cage rigidly secured at one side of said annular member for retaining said rocker arms in position on said annular member, a plurality of bearing segments rockably supported on said rocker arms, a leveling disk tiltable about a central pivot and disposed below said annular member, and means coacting between said disk and the opposite side of said annular member for operatively supporting said annular member whereby to permit automatic equalization of thrust pressure among said segments.

6. In a thrust bearing of the type described, a flat annular member adapted to encircle a shaft, annular cage means superimposed on said annular member and rigidly secured thereto, said cage means having a flat annular portion axially spaced above said annular member and provided with a plurality of elongated slots, a plurality of rocker arms disposed in said slots and rockably supported on said annular member, a plurality of bearing segments rockably disposed on said rocker arms above said slots, and a plurality of upright prongs at the inner and outer peripheries of said cage means coacting with opposite sides of said bearing segments for retaining the same on said rocker arms.

7. In a thrust bearing of the type described, an assembly comprising a flat annular support, a cage having a flat annular portion superimposed over said support and provided with a plurality of elongated slots, a plurality of rocker arms disposed in said slots and rockably supported on said support, a plurality of bearing segments rockably supported on said rocker arms, a plurality of spaced eyelets extending through said support and said portion of said cage intermediate said rocker arms and rigidly securing said support and said cage together, and fixed retainer means adapted to project rigidly from supporting structure adjacent the bearing and extending through the openings in said eyelets for holding the assembly against rotation.

8. In combination, a vertical shaft; a radial bearing disposed around the lower end of said shaft; thrust bearing means disposed above said radial bearing and including an annular support surrounding the shaft, a plurality of rocker arms tiltably mounted on said support and carrying a plurality of rockably supported bearing segments; a leveling disk disposed below said radial bearing and supported substantially at its center for tilting movement; and a plurality of elongated support pins extending axially between said support and said disk and disposed around said radial bearing.

9. In combination, a vertical shaft; a radial bearing disposed around the lower end of said shaft; a housing concentric with said radial bearing; thrust bearing means disposed above said radial bearing and including an annular support surrounding the shaft, a plurality of rocker arms tiltably mounted on said support and carrying a plurality of rockably supported bearing segments; a leveling disk disposed below said radial bearing and supported substantially at its center for tilting movement; and a plurality of elongated support pins extending axially through said housing and engaging said support and said disk.

10. In combination, a vertical shaft; housing structure around the lower end of said shaft including an end cap; an upright tubular extension on said cap concentric with the lower end of said shaft and providing a bearing housing; a radial bearing disposed around the end of said shaft and mounted in said bearing housing; said bearing housing being provided with a plurality of axial bores in circumferentially spaced relation; thrust bearing means disposed above said radial bearing and including an annular support surrounding the shaft, a plurality of rocker arms tiltably mounted on said support and carrying a plurality of rockably supported bearing segments; a leveling disk disposed below said radial bearing and supported substantially at its center for tilting movement; and a plurality of elongated supporting pins extending loosely through said bores and engaging said support and said disk for permitting automatic leveling and thrust pressure equalization in said thrust bearing means.

11. In combination, a vertical shaft; housing structure around the lower end of said shaft including an end cap; an upright tubular extension on said cap concentric with the lower end of said shaft and providing a bearing housing; a radial bearing disposed around the end of said shaft and mounted in said bearing housing; thrust bearing means disposed above said radial bearing including a rotatable bearing member operatively attached to said shaft for rotation therewith and a non-rotatable bearing assembly having a plurality of coacting rockably supported bearing segments; and fixed retainer pin means extending axially from the inner end of said bearing housing and operatively engaging said bearing assembly for preventing rotation of the latter.

12. In a thrust bearing of the type described, a supporting disk having a substantially flat upper surface and provided with an annular channel in said surface, a plurality of elongated rocker arms tiltably disposed within said channel with the ends of said arms projecting about said surface, a plurality of bearing segments rockably supported at the ends of said rocker arms and disposed entirely above said surface and beyond the confines of said channel, and pivot means engaging the bottom of said disk substantially at its center for permitting tilting movement of said disk.

13. In a thrust bearing of the type described, a supporting disk provided with an annular channel in its upper surface, a plurality of elongated rocker arms tiltably disposed within said channel, a plurality of bearing segments rockably disposed at the ends of said rocker arms, pivotal supporting means at the bottom and substantially at the center of said disk for permitting tilting movement of the disk, a plurality of projections extending upwardly from the disk on opposite sides of said channel and coacting with said bearing segments for retaining the latter in place on the rocker arms, and a plurality of projections extending upwardly from the bottom of said channel and coacting with said rocker arms for retaining the latter in place in said channel, said first-named projections being disposed in substantially radial alignment with the points of rockable support of the corresponding bearing segments on said arms whereby to minimize frictional resistance to rocking of said bearing segments.

14. In combination, a vertical shaft, housing structure around the lower end of said shaft having a threaded opening at the bottom thereof, a thrust bearing member secured around said shaft and rotatable therewith, a plurality of coacting non-rotatable rockable bearing segments, pressure-equalizing means including a tiltable disk having said segments operatively supported thereon whereby to permit equalization of thrust pressure among said segments, said disk having a central convex projection depending therefrom, and an adjustable closure plug threaded into said opening at the bottom of the housing structure and having a central concave depression with the convex projection of said disk being seated therein for permitting tilting movement of the disk, said closure plug being threadedly adjustable inwardly and outwardly of said housing structure for moving said disk upwardly and downwardly whereby to regulate the relative axial position of said shaft.

15. The structure of claim 12 further characterized in that said rocker arms are elongated straight members disposed in generally chordal relation within said annular channel.

16. The structure of claim 13 further characterized in that said projections comprise a plurality of upright pins extending rigidly from the disk and fitting loosely in complementary openings in said bearing segments and said rocker arms.

17. In combination, a vertical shaft, housing structure around the lower end of said shaft, a thrust bearing member secured to the shaft and rotatable therewith in said housing structure, a plurality of coacting non-rotatable rockable bearing segments, pressure-equalizing means including a disk having said segments operatively supported thereon in circumferentially spaced relation, and a pivot screw extending upwardly through the bottom of said housing structure and engaging said disk substantially at its center for tiltably supporting the disk whereby to permit equalization of thrust pressure among said segments, said screw being adjustable in said housing structure for raising and lowering said disk whereby to adjust the axial position of said shaft relative to the housing structure.

18. In combination, a vertical shaft, housing structure around the lower end of said shaft, thrust bearing means for said shaft including a rotatable bearing member operatively attached adjacent the lower end of said shaft for rotation therewith, a supporting disk adjacent the bottom of said housing structure below the lower end of said shaft and having an annular channel in its upper face, a plurality of elongated rocker arms tiltably disposed within said channel, bearing segments rockably supported at the ends of said rocker arms and coacting with said rotatable bearing member, and an upright pivot screw mounted in the bottom of said housing structure and having a convex upper end portion, said disk having at its lower face a concave depression at the center of the disk with the convex upper end of said screw received therein for tiltably supporting the disk, said screw being vertically adjustable in said housing structure for raising and lowering said disk whereby to adjust the axial position of said shaft relative to the housing structure.

19. In a thrust bearing of the type described, a leveling and supporting disk having an annular channel at its upper surface, means pivotally supporting said disk substantially at its center for permitting tilting movement of the disk, a plurality of rocker arms tiltably disposed in said channel in circumferentially spaced arrangement, bearing segments operatively supported for rocking movement at the ends of said rocker arms, and retainer means coacting between said disk and each of said bearing segments for retaining the latter in place on said rocker arms, said retainer means being disposed outside the confines of said channel and in substantial alignment with the point of rockable support of the corresponding bearing segment whereby to minimize frictional resistance to rocking of said bearing segments.

References Cited in the file of this patent

UNITED STATES PATENTS

| 1,117,499 | Kingsbury | Nov. 17, 1914 |
| 1,272,041 | Herr | July 9, 1918 |
| 1,378,544 | Kingsbury | May 17, 1921 |
| 1,767,238 | Howarth | June 24, 1930 |
| 1,839,497 | Peterson | Jan. 5, 1932 |
| 2,037,326 | Howarth | Apr. 14, 1936 |
| 2,093,800 | May | Sept. 21, 1937 |

FOREIGN PATENTS

| 957,368 | France | Feb. 17, 1950 |